United States Patent
Beaman et al.

(10) Patent No.: US 6,356,268 B1
(45) Date of Patent: *Mar. 12, 2002

(54) METHOD AND SYSTEM FOR PROVIDING MULTIPLE GLYPHS AT A TIME FROM A FONT SCALER SUB-SYSTEM

(75) Inventors: Alexander B. Beaman, Cupertino, CA (US); Michael R. Reed, Chapel Hill, NC (US)

(73) Assignee: Apple Computer, Inc., Cupertino, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/638,489

(22) Filed: Apr. 26, 1996

(51) Int. Cl.[7] .............................................. G06T 11/00
(52) U.S. Cl. ...................................................... 345/467
(58) Field of Search ................................. 345/143, 467, 345/471, 472, 439, 128, 129, 130, 508, 536, 472.1, 472.2; 709/230

(56) References Cited

U.S. PATENT DOCUMENTS

| | | | |
|---|---|---|---|
| 5,016,001 A | * | 5/1991 | Minagawa et al. ......... 345/508 |
| 5,329,619 A | * | 7/1994 | Page et al. .................. 395/200 |
| 5,533,174 A | * | 7/1996 | Flowers, Jr. et al. ........ 395/114 |
| 5,586,241 A | * | 12/1996 | Bauermeister et al. ...... 395/167 |
| 5,613,090 A | * | 3/1997 | Willems ...................... 395/500 |
| 5,684,510 A | * | 11/1997 | Brassell et al. ............. 345/143 |
| 5,925,103 A | * | 7/1999 | Magallanes et al. ........ 709/230 |

OTHER PUBLICATIONS

Acton et al (Class and User Based Parallelism in Raven: 1063–7133/93: IEEE1993), 1993.*

Ye et al (Study and Design of Scalable Memory–Shared Multiprocessing System: 0–8186–7876–3/96), 1997.*

* cited by examiner

*Primary Examiner*—Ulka J. Chauhan
*Assistant Examiner*—Mano Padmanabhan
(74) *Attorney, Agent, or Firm*—Sawyer Law Group LLP

(57) ABSTRACT

A method and system for providing multiple typographic glyph data items to a requesting client from a font scaler sub-system. The method and system includes accepting a request from the client that describes multiple glyphs and a destination memory in which to store the glyphs. From the request, a transaction message is formed and transmitted to a scaler server using an application program interface. The scaler server then generates the multiple glyph data items from the descriptions of the multiple glyphs, and stores the glyph data items directly into the destination memory.

23 Claims, 4 Drawing Sheets

METHOD AND SYSTEM FOR PROVIDING MULTIPLE GLYPHS AT A TIME FROM A FONT SCALER SUB-SYSTEM

CROSS-REFERENCE TO RELATED APPLICATIONS

The present application is related to application Ser. No. 08/638,490, entitled "A METHOD AND SYSTEM FOR SUPPORTING MULTIPLE FONT FORMATS BY A FONT SCALER SUB-SYSTEM," filed on the same date as the present application and assigned to the assignee of the present application.

FIELD OF THE INVENTION

The present invention generally relates to graphic output of text, and more particularly relates to typographic glyph construction of a user's input text within a computer system.

BACKGROUND OF THE INVENTION

Current computer systems provide individuals with opportunities to produce documents of professional quality, such as with desktop publishing software and graphics software programs. The ability to manipulate the appearance of the text within these programs is vital in allowing users greater flexibility and creativity in document production. Included in these manipulations are changes in fonts, justification, size, and other aspects of the appearance, such as bolding and italicizing.

Although most programs can perform manipulations with some level of success, each program has a limitation in its range of manipulations due to design considerations. Some programs, such as QuickDraw GX from Apple Computer, Cupertino, Calif., provide more sophistication and enhanced capabilities than other programs to allow more choices for users. Unfortunately, these enhanced capabilities are normally not transferable to other programs. Thus, attempts to incorporate such capabilities, such as different fonts, from one program into another are also usually quite limited and typically unsuccessful.

Accordingly, a need exists for a flexible and portable system that allows accurate and efficient manipulations of textual data in a graphics system. The present invention addresses such a need.

SUMMARY OF THE INVENTION

The present invention provides a method and system for providing multiple typographic glyph data items to a requesting client from a font scaler sub-system. The method and system includes accepting a request from the client that describes multiple glyphs and a destination memory in which to store the glyphs. From the request, a transaction message is formed and transmitted to a scaler server using an application program interface. The scaler server then generates the multiple glyph data items from the descriptions of the glyphs, and stores the glyph data items directly into the destination memory.

According to the system and method disclosed herein, the present invention amortizes set-up operations over the number of glyphs in the request, which reduces overhead and increases overall system performance. Further, the present invention eliminates the need for two copies of each glyph generated to exist simultaneously, which conserves system resources.

DETAILED DESCRIPTION

The present invention relates to typographic glyph construction in a computer system. For purposes of this discussion, typographic glyph construction refers to the formation of graphical representations displayed on a screen or output from the computer system based on the textual inputs and manipulations by a user, usually made via an input device, such as selection of keys on a keyboard. The following description is presented to enable one of ordinary skill in the art to make and use the invention and is provided in the context of a patent application and its requirements. Various modifications to the preferred embodiment and the generic principles and features described herein will be readily apparent to those skilled in the art.

In order to more fully describe the present invention, some definitions for the terminology used herein are now provided. Text refers to words of something written or printed. Within a line of text, are several runs of text. A run of text refers to text sharing a same style and/or encoding scheme within a line of text. An encoding scheme specifies the actual character code byte values for a given language and computer standard.

Characters are abstract objects having a single and unique semantic or phonetic meaning. Glyphs, as opposed to characters, represent the visual, graphical appearance of a character. The particular representation of a character by a glyph is done in the context of the font, the font being a collection of glyphs which typically have an element of design consistency in their appearance. In a preferred embodiment, the font contains a table that can map characters in one or more standard encoding schemes to glyph codes and those glyph codes have meaning within that font.

Within a given font, such as Geneva, Helvetica, Times, etc., aspects including serifs, stroke thickness, ligatures, and contextual forms have a degree of commonality. Serifs refer to fine lines in printing used for finishing off main strokes of a character, while ligatures refer to rendering forms that represent combinations of two or more characters, such as the combination of an "f" and an "i" into "fi". Contextual forms are alternate appearances of a glyph whose use is dependent on certain contexts. Thus, the same character within a font may have different appearances, i.e., separate glyphs, each of which may have different contextual forms. For example, in Arabic, the same character can change appearance depending upon its position within a word.

Figure 1:
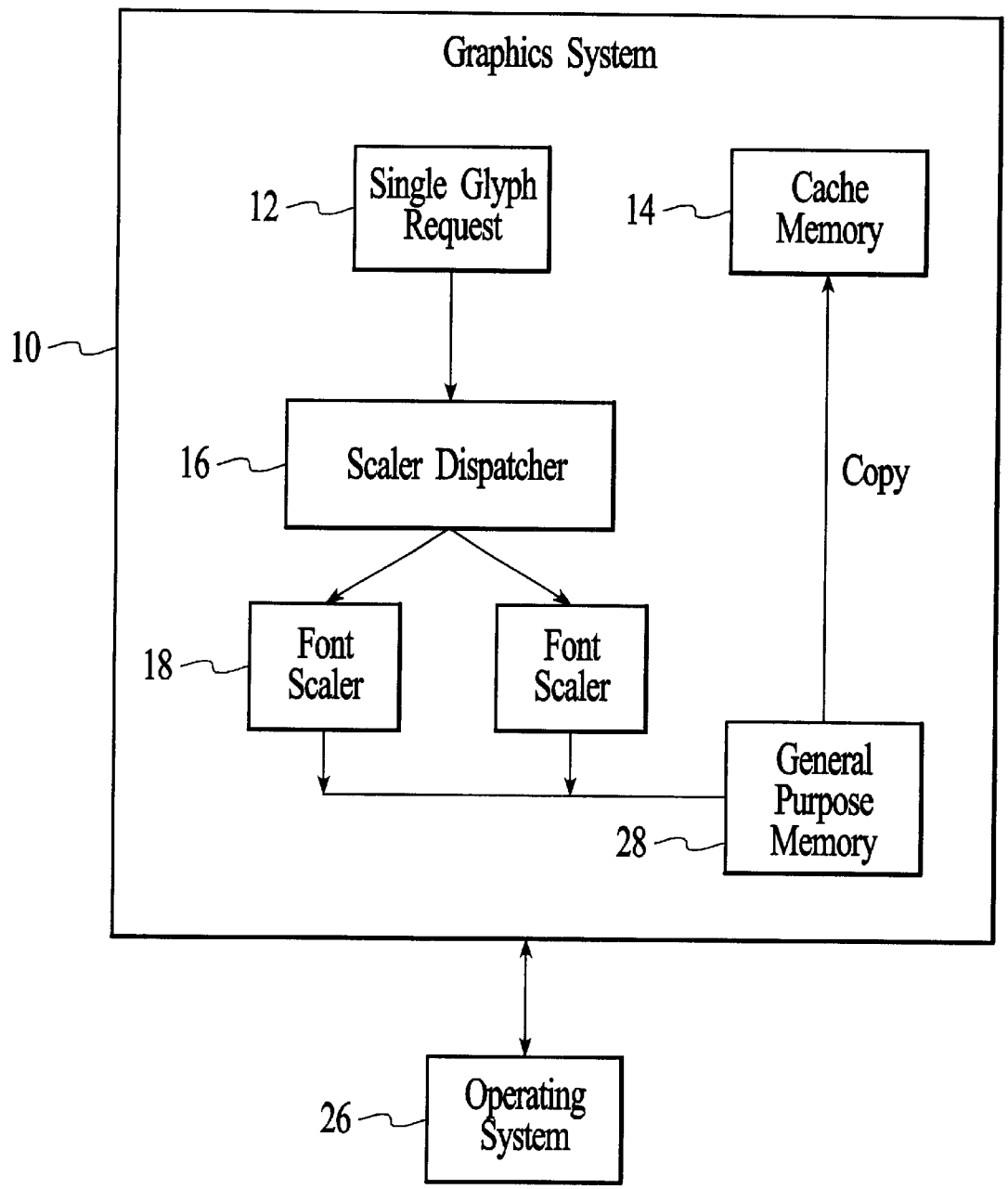
FIG. 1 is a block diagram illustrating components of a conventional graphics application.

FIG. 1 is a block diagram illustrating components of a conventional graphics system 10. The graphics system 10 enables the manipulation of graphics and text working in conjunction with an operating system 26, such as System 7 from Apple Computer, running on a computer system, such as an Apple Macintosh. To generate glyphs, the graphics system 10 utilizes a cache memory 14, a scaler dispatcher 16, one or more font scalers 18, and general purpose memory 28. The scaler dispatcher 16 provides a mechanism that permits support of multiple font file formats and provides an interface to the font scalers 18, which support the various font file formats.

As a user inputs text, the graphics system 10 converts text characters to glyph codes and processes the glyphs one at a time by forming a single glyph request 12 and sending the glyph request to the font service unit 16. The request 12 may ask for a glyph rendering in the form of a bitmap or an outline, or the request 12 may ask only for glyph metric information. The request 12 includes a strike description that specifies the desired font, transformation and resolution information, and font variation information. From the font specification, the font format can be determined. The request 12 also specifies which glyph is desired using a two-byte glyph code.

Each font contains data organized into three classes of tables; public tables, public format layout tables, and font format-specific tables. Public tables are the minimum amount of data needed for the font to be used by the graphics system 10 and they provide such information as character mapping information and the name of the font.

Public format layout tables are used for linguistic and stylistic manipulation. Public format layout table are not mandatory, but may be required by certain languages.

Font format-specific tables are usually proprietary and the font includes a four-byte tag that indicates the type of proprietary font format, which in turn, identifies which font scaler 18 should be used to generate the glyph data.

When the scaler dispatcher 16 receives the single glyph request 12, the scaler dispatcher 16 passes the request to the font scaler 18 where the glyph data will be computed. Both the scaler dispatcher 16 and the font scaler 18 in the graphics system 10 are written as separate software modules. The single glyph request 12 is passed to the scaler dispatcher 16 and on to the font scalers 18 using synchronous function calls. The request 12 is first passed to the scaler dispatcher 16 via one function call, and the scaler dispatcher 16 passes the glyph request 12 to the appropriate font scaler 18 via a second function call.

Before the graphics system 10 sends the request 12, the graphics system allocates sufficient cache memory 14 to store the glyph metric or rendering. When the call to generate the requested glyph data item reaches the font scaler 18, via the scaler dispatcher 16, the font scaler 18 also allocates sufficient general purpose memory 28 to store the glyph data item. Once the glyph data item is generated, the font scaler 18 stores the glyph data item in the general purpose memory 28. After the glyph data is computed, the graphics system 12 must then copy the glyph data from the general purpose memory 28 into the cache memory 14.

Besides being inflexible and incapable of producing glyph renderings and font data to other graphics systems that may be present in the computer system, the glyph processing in a traditional graphics system 10 suffers several drawbacks. One drawback is that because the graphics system 12 processes only one glyph request 12 at a time, the graphics system's memory management system is inefficient. To respond to a request 12, the cache memory 14, the scaler dispatcher 16, and the font scalers 18 must perform set-up operations that produce significant overhead for processing each glyph request 12. Due to the overhead involved, such set-up operations degrade the overall performance of the graphics system 10.

Another drawback of the graphics system 10 is that two copies of each generated glyph data item must exist at the same time; one copy in the system memory 28, and one copy in the cache memory 14, which is a waste of valuable system resources.

The present invention is a method and system for providing multiple glyphs at a time to a client from a font scaler sub-system. In a single request to the font scaler sub-system, the client is able to describe multiple glyphs and a destination memory in which to store the glyphs. In response to the multi-glyph request, the font scaler sub-system generates the glyph data items and stores them directly into the destination memory specified by the client.

According to the present invention, the set-up operations performed for the multi-glyph request is amortized over the number of glyphs in the request, which reduces overhead and increases overall system performance. And since the font scaler sub-system stores glyph data items directly into a destination memory, there is no need to store and copy the glyphs from system memory, which conserves system resources. To more fully describe one embodiment of the present invention, refer now to FIG. 2.

Figure 2:
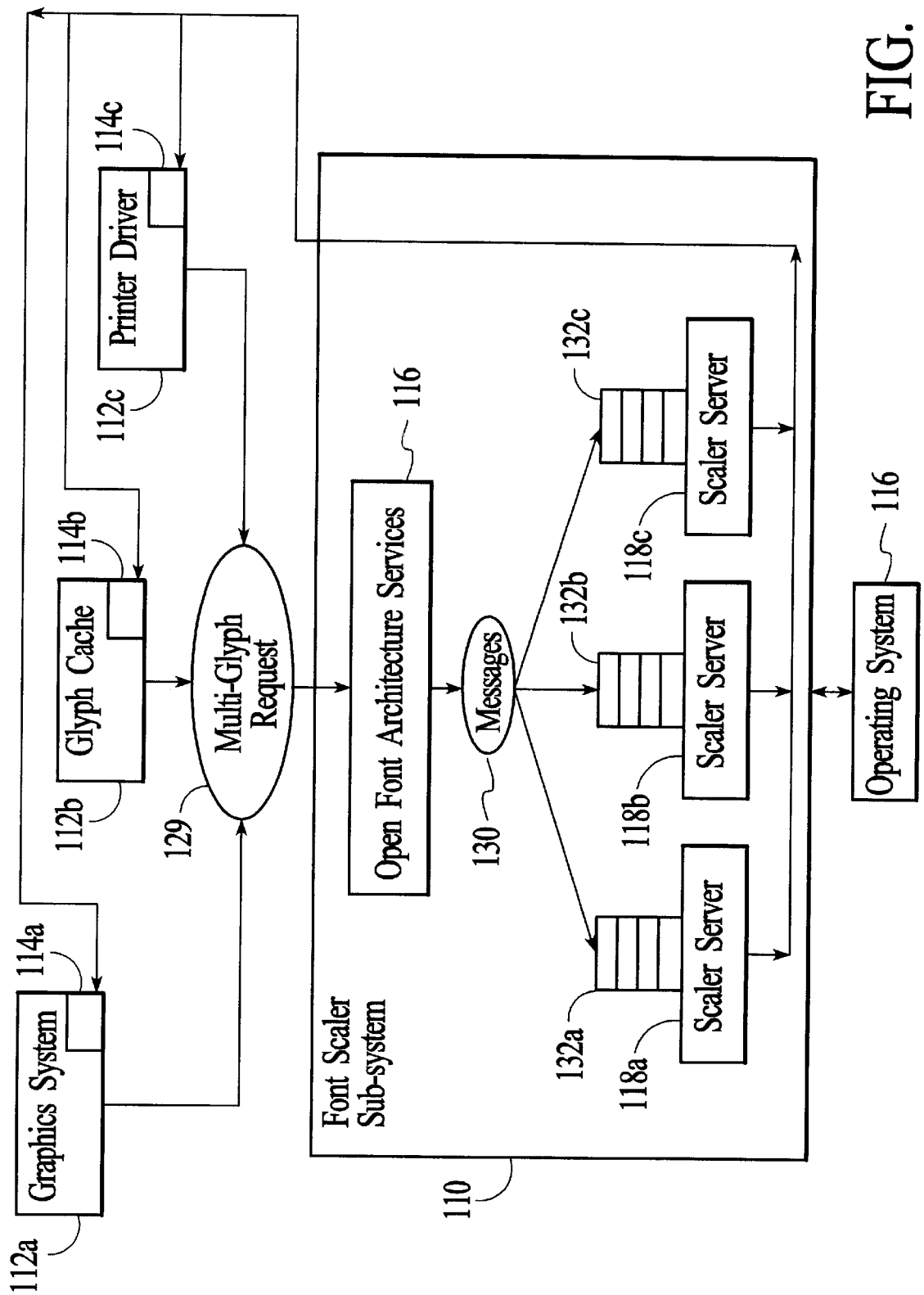
FIG. 2 is a block diagram illustrating components of a font scaler sub-system in a preferred embodiment of the present invention.

FIG. 2 is a block diagram illustrating components of a font scaler sub-system 110 in accordance with the present invention. The font scaler sub-system 110 includes an open font architecture services unit 116, and one or more scaler servers 118a, 118b and 118c.

The open font architecture services unit 116 is an application program interface (API) that allows various clients 112a, 112b and 112c of the font scaler sub-system 10 to send multi-glyph requests 129 to the scaler servers 118 for glyph generation. Clients of the font scaler sub-system 110 may include a graphics system 112a, such as QuickDraw GX, for example, and a printer driver 112c. The graphics system 112a may request that the glyphs be stored in graphics memory 114a, and the printer driver 112c may specify that the requested glyphs be transmitted to a buffer, where it will then be sent to the printer memory 114c.

Another example of a client of the font scaler sub-system 10 is a glyph cache 112b, which is a component of a glyph server (not shown). As disclosed in copending application Ser. No. 08/630,864, entitled "METHOD AND APPARATUS FOR TYPOGRAPHIC GLYPH CONTSTRUCTION INCLUDING A GLYPH SERVER," which is herein incorporated by reference, a glyph server is a portable unit that is capable of interfacing with a variety of graphics systems. Instead of generating glyph data themselves, a graphics system requests glyphs from the glyph server, which then services the request. The glyph cache 112b is used by glyph server to store generated glyphs for high speed access. Thus, as a client of the font scaler sub-system 10, the glyph cache 112b may request that the glyph data items be stored in the memory 114B of the glyph cache 112b.

In operation, a client 112a–112c (hereinafter client 112) sends the multi-glyph request 129 to the open font architecture services unit 116 via API calls, and then the open font architecture services unit 116 passes the multi-glyph request 129 to the appropriate scaler server 118.

According to the present invention, scaler servers 118 are implemented as processes, rather than as static modules. Implementing the scaler servers 118 as processes enables the scaler servers 118 to communicate via transactions, which include a request message and a corresponding reply. Thus, the font scaler sub-system 10 of the present invention, supports asynchronous transactions between the open font architecture services unit 116 and the scaler servers 118, rather than synchronous function calls.

According to the present invention, a message protocol is provided that supports asynchronous message 130 transmissions between the open font architecture services unit 116 and the scaler servers 18. The message protocol further includes API functions for the open font architecture services unit 116 that support direct addressability of client memory 114 by the scaler server 118. Through the use of the API functions, the scaler server 118 can deposit multiple glyph data items directly into the client memory 114 at the same time, which further amortizes set-up overhead. The open font architecture services unit 116 also provides protocols for preparing to receive and for requesting multiple glyphs. Those protocols are referred to as the API functions GET-GLYPH-DATA-SPECS and GET-GLYPH-DATA.

The client 112 invokes the GET-GLYPH-DATA-SPECS function call in order to request size information regarding the described glyphs. This call is made so that the client 112 can plan for the storage of the requested glyph data items. The open font architecture services unit 116 passes the GET-GLYPH-DATA-SPECS call to the scaler server 118 in the form of a message 130. If the glyph data is a rendering, then the scaler server 118 will return both an indication that the glyph data item may have a variable length, and an estimate of the size of the rendering. Given the size estimate and the number of glyphs requested, the client 112 allocates sufficient memory 114 to store the glyphs.

After allocating sufficient memory 114 to receive the glyphs, the client 112 invokes the GET-GLYPH-DATA call to transmit the multi-glyph request 129. The GET-GLYPH-DATA call requests that the open font architecture services unit 116 to request the scaler server 118 to generate the glyph data items.

In a preferred embodiment, the GET-GLYPH-DATA call includes the following parameters.

1) an indication of the number of glyphs requested;
2) a glyph code array;
3) a glyph data description;
4) a strike description;
5) a strike moniker;
6) a destination memory structure; and
7) a glyph data result structure.

The glyph code array is the mechanism by which the client 112 may specify more than one glyph in a single request. The glyph code array is an array of glyph codes that identify each glyph in a run of input text, where each character in the text was first encoded with unique codes assigned to a particular encoding scheme, such as MacIntosh Arabic, Macintosh Roman or Unicode, for instance.

The glyph data description describes what data is desired for the glyphs identified in the glyph code array. The glyph data description may describe the glyph data as either a glyph rendering or a glyph metric. A glyph rendering includes specifics on the rendering, such as whether it is anti-aliased, while a glyph metric may include specifics on the metrics, e.g., fractional or device metrics. Other additional attributes may also be included.

The strike description describes how the glyphs in the glyph code array are to be displayed. The strike description specifies an ID for the font used, a font variation specification, and transformation information, including a 3×3 transformation matrix, point size, resolution, spot size, and flags. Minimally, the strike description identifies which scaler server 118 is to generate the glyph data. The strike moniker is used in subsequent request by the scaler server 118 for quickly recalling the strike description.

The destination memory structure describes the client memory 114 that was allocated to receive the glyph data (metrics, bitmaps, paths, etc.) from the scaler server 118. The destination memory structure contains a pointer to the allocated memory 114, the size of the memory 114, and the type of memory (global or remote) and an identifier for the allocated memory's address space, if remote. The size indicated in the destination must be large enough to hold the number of glyphs requested multiplied by the size of the data. For variable length data, such as renderings, the indicated size may be too small having been based on an estimate. Passing the destination memory structure as a parameter in the API of the present invention is the mechanism that provides the scaler server 118 with direct addressability of the client memory 114.

The glyph data result structure is used by the scaler server 118 after generating the requested glyph data items. The structure will contain the number of glyphs data items completed and size of each glyph data item. The glyph data result structure is used to handle variable length glyph data; if the glyph data items are fixed length, then the glyph data result structure in unnecessary.

The glyph code array, the glyph description, and the strike description instruct the scaler server 118 to generate glyph data for the glyphs identified in the glyph code array based on the glyph description and in the context of the given strike description.

In a preferred embodiment, the glyph data description and the strike description are composed as attribute groups. An attribute group preferably refers to a structured block of memory organized as pairs of tag names and variable length values, where the attribute values are accessed by their tag names.

After the open font architecture services unit 116 receives the GET-GLYPH-DATA function call, the open font architecture services unit 116 assembles a message 130 from the parameters. The details of the message 130 transmission are operating system 126 dependent. The message 130 body, however, is preferably implemented as an attribute group (tag plus value pairs). In addition to the parameters described above, the message 130 also includes a message type field.

According to the present invention, the attribute group implementation permits the open font architecture services unit 116 to specify the glyphs being requested using one of three methods, rather than one. Each of the three glyph specification types includes a tag and a value.

The tag in the first glyph specification method indicates an array-of-glyphs. The value corresponding to an array-of-glyph tag informs the scaler server 118 of the glyph codes and the size of the value is used to compute the actual number of glyphs being requested.

The tag in the second method indicates a range-of-glyphs, and the value corresponding to an range-of-glyphs tag includes two glyph codes (start and end). The scaler server 118 uses the two codes to determine the number of glyphs being requested by taking the difference of the two codes and adding one.

The tag in the third glyph specification method indicates a bit array, and the value is an array of bytes having a length sufficient to hold one bit for each glyph in the font rounded up to the nearest eight The scaler server 118 determines how many glyphs to make by counting the one bits in the value, where the one bit indicates which of those glyphs to make.

Although, the glyph specification methods above are the preferred methods in the message protocol of the present invention, the message protocol supports other glyph specification methods, such as identifying glyphs by names in the value fields, rather than numbers, for example.

After assembling the message 130, the open font architecture services unit 116 dispatches the message 130 to the scaler server 118 identified in the strike description. Because a scaler server 118 is a process, the messages 130 sent from the open font architecture services unit 116 are delivered to the scaler server 118 by the operating system 126. If the scaler server 118 is processing a previous message, then the operating system 126 places the message into a message queue 132 that corresponds to the scaler server 118.

Although there is overhead associated with reformatting the multi-glyph request 129 into a message 130, such as assembling and transmitting the message 130, and receiving a reply, the overhead is more than compensated for by providing descriptions for more than one glyph in each message 130 that is sent to the scaler server 118.

After receiving the message 130, the scaler server 118 maps the allocated client memory 114 into the space of the scaler server 118, if necessary, to gain direct addressability of the client memory 114. The scaler server 118 then generates the requested glyphs and stores them directly into the client memory 114. In addition, the scaler server 118 fills in the glyph data result structure to identify the glyph data items successfully stored in the client memory 114.

Because the client 112 allocated the memory 114 based on the scaler server's estimate, all of the generated glyphs may not fit in the allocated client memory 114. Therefore, if the value in the number of glyphs completed field in the glyph data result structure is less than the number of glyphs requested, then the client 112 must allocate additional client memory 114 to store the remaining glyphs data items, which will be obtained in additional calls.

In certain cases the scaler server 118 may err in estimating the size of the glyph to be generated. This may result in the scaler server 118 not being able to fit even one generated glyph into the allocated client memory 114. In this case, the glyph data result array contains a value of zero in the number of glyphs completed field, and the first entry in the glyph data result array contains the size of the glyph that did not fit. Given this information, the client revises the estimate and allocates a larger block of client memory 114. The client 112 may allocate memory for one glyph at a time or allocate sufficient memory for as many generated glyphs as possible.

Figure 3:
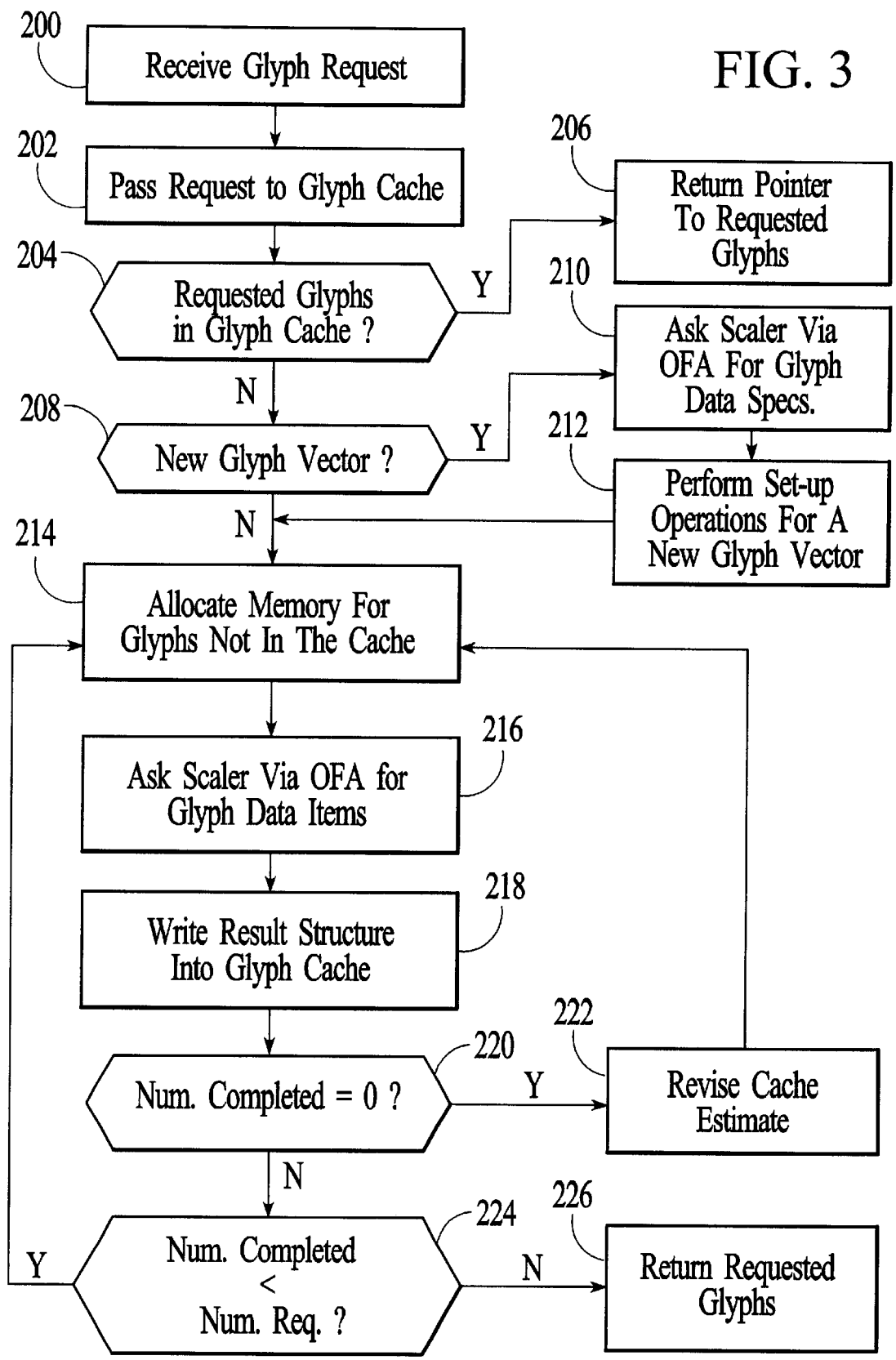
FIG. 3 is a flow chart illustrating the operations of the font scaler sub-system when processing multi-glyph request according to the present invention.

FIG. 3 is a flow chart illustrating the operations of the font scaler sub-system 110 when processing multi-glyph request in accordance with the present invention. The operations are explained using the glyph cache 112b as an example client 112.

If the glyph cache 112b is part of a glyph server, then the glyph server will first receive a multi-glyph request from another client 112 in step 200, and then pass the multi-glyph request to the glyph cache 112b in step 202.

After the multi-glyph request is passed to the glyph cache 112b, it is determined whether the glyph cache 112b contains glyph data corresponding to each of the glyph descriptions specified in the multi-glyph request in step 204. If all the glyph data is present in the glyph cache 112b, then pointers to the glyph data are returned to the client 112 in step 206. If the glyph cache 112b contains less than all the glyph data described in the multi-glyph request, then the glyph data must be generated by the appropriate scaler server 118, as described below.

The glyph cache 112b first determines whether this particular combination of the strike description and glyph data description, called a glyph vector, has been previously requested in step 208. If the glyph vector is new, then the glyph cache 112b request the appropriate scaler server 118 via the open font architecture services unit 116 for a glyph data specification, which includes an estimate of the size of each generated glyph, in step 210. The glyph cache 112b also performs set-up operations necessary for a new glyph vector in step 212.

If the glyph vector is not new, then the glyph cache 112b attempts to allocate memory for the glyphs not present in the glyph cache 214 using the glyph size estimate (or other heuristic) in step 112b. After allocating memory, the glyph cache 112b request the glyph data from the scaler server 118 via the open font architecture services unit 116 in step 216.

After generating the glyph data items, the appropriate scaler server 118 writes the result structure into the allocated cache memory in step 218. If the result structure indicates that the number of glyphs completed is zero in step 220, then the glyph cache 112b revises the glyph size estimate in step 222, and processing resumes at step 214. If the number of glyphs completed is less than the number requested in step 224, then processing resumes at step 214 to generate the remaining glyphs. If the number of glyphs completed equals the number requested, the glyph cache 214 returns the generated glyph data from the cache 214 to the requesting client 112 in step 226.

Figure 4:
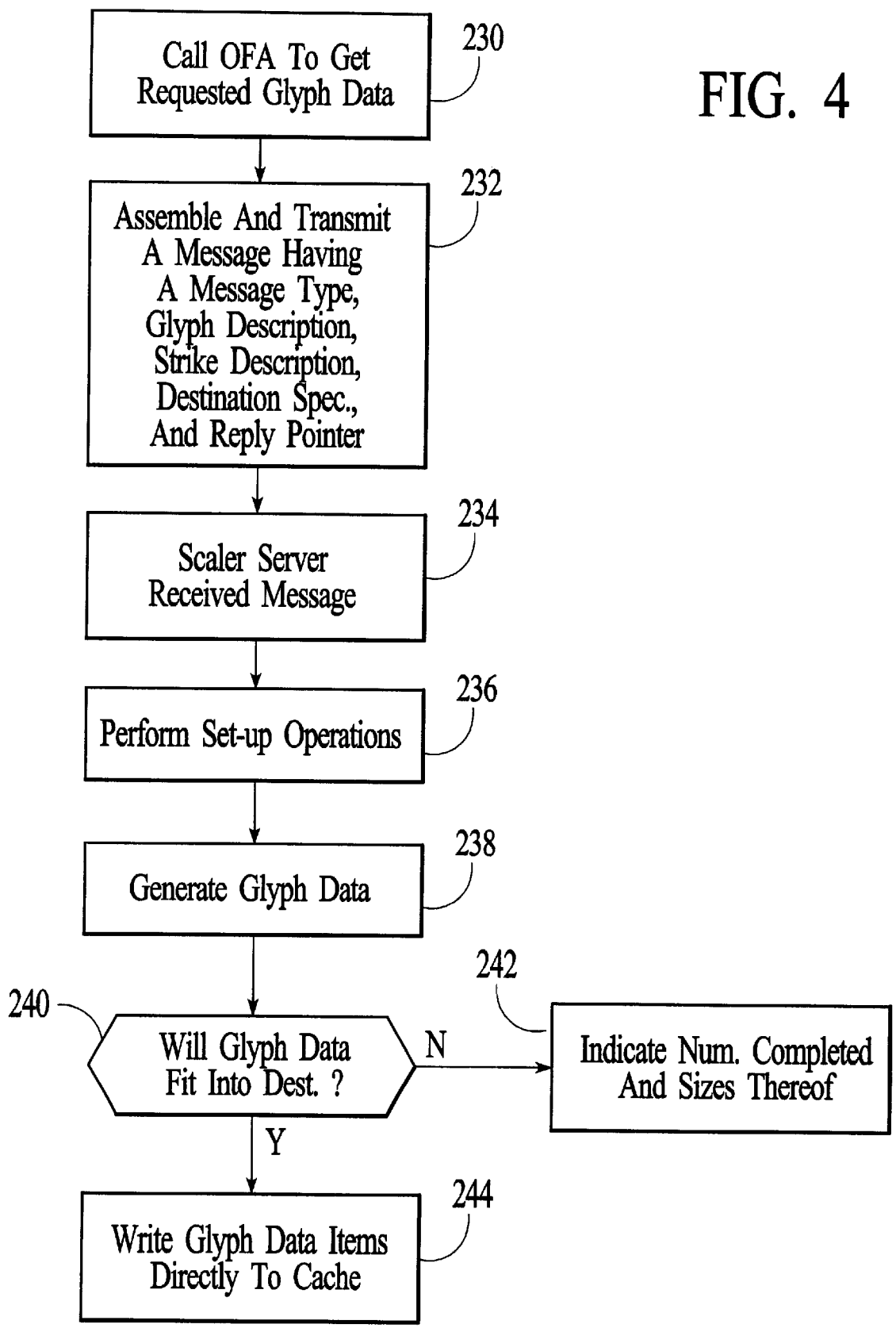
FIG. 4 is a flow chart detailing the steps that occur when glyph cache client requests glyph data from the scaler server 118 via the open font architecture services unit.

FIG. 4 is a flow chart detailing the processing steps taken in step 216 of FIG. 3 when the glyph cache 112b requests glyph data from the scaler server 118 via the open font architecture services unit.

In step 230, the glyph cache 112b makes a GET-GLYPH-DATA function call to the open font architecture services unit 116. After the open font architecture services unit 116 receives the GET-GLYPH-DATA function call, the open font architecture services unit 116 assembles and transmits a message 130 in step 232.

After the message is transmitted, the scaler server 118 receives the message 130 using the operating system message API in step 234. The scaler server 118 performs set-up operations in step 236 that include processes such as mapping the allocated cache memory to the address space of the scaler server 118, retrieving items from an internal scaler server cache (not shown), allocating working memory, and accessing font data, for example.

After the set-up, the scaler server 118 generates the glyph data for each glyph requested in step 238. It is then determined whether the generated glyph data items will fit into the destination memory in step 240. If not, then the scaler server 118 indicates the number of glyph items completed and the sizes thereof in step 242. If the generated glyph data items all fit into the destination memory, then the generated glyph data items are written directly into the allocated memory in the glyph cache 112b in step 244.

A font scaler sub-system has been disclosed that is readily adaptable for use with a variety of clients, allows multiple glyphs to be requested at a time, and writes generated glyph data directly into the client designated memory.

Although the present invention has been described in accordance with the embodiments shown, one of ordinary skill in the art will recognize that there could be variations to the embodiment and those variations would be within the spirit and scope of the present invention. Accordingly, many modifications may be made by one of ordinary skill without departing from the spirit and scope of the present invention, the scope of which is defined by the following claims.

What is claimed is:

1. A method for providing requested glyph data items to multiple software clients from a font scaler sub-system on a single computer having an operating system, comprising the steps of:

(a) directly accepting by the font scaler sub-system a first request from a first software client via an application programming interface (API) on the single computer, the request including a first description of a first set of glyphs and a destination field indicating a location of a first destination memory, wherein the first set of glyphs is less than all characters in a font;

(b) accepting by the font scaler sub-system a second request from a second software client via the API on the single computer, the request including a second description of a second set of multiple glyphs and a destination field indicating a location of a second destination memory;

(c) forming a first message from the first request;

(d) forming a second message from the second request;

(e) asynchronously sending the first message to a scaler server process via the operating system;

(f) asynchronously sending the second message to the scaler server process via the operating system;

(g) generating first multiple glyph data items from the first description of the first set of multiple glyphs;

(h) storing the first multiple glyph data items directly into the first destination memory at the same time;

(i) generating second multiple glyph data items from the second description of the second set of multiple glyphs; and (j) storing the second multiple glyph data items directly into the second destination memory at the same time.

2. A method as in claim 1 wherein step (c) further includes the step of:

(c1) placing a glyph code array, a glyph data description, and a strike description in the first message.

3. A method as in claim 1 wherein step (a) further includes the step of:

(a1) allocating sufficient first destination memory to store the glyph data items described in the first request.

4. A method as in claim 3 wherein steps (a) and (b) further include the steps of:

passing the first and second requests to an open font architecture services unit.

5. A method as in claim 4 wherein step (a1) further includes the step of:

(a1i) estimating the size of the glyph data items before allocating the first destination memory.

6. A method as in claim 5 wherein step (a1) further includes the step of:

(A1ii) requesting the scaler server process to perform the estimate.

7. A method for providing requested glyphs at a time to multiple software clients from a font scaler sub-system on a single computer having an operating system, the font scaler sub-system including a font services unit, and a first scaler server and a second scaler server, the method comprising the steps of:

(a) sending a first client request directly to the font services unit via an application programming interface (API) on the single computer that describes a first set of multiple glyphs and includes a destination field indicating a location of a first destination memory, wherein the first set of glyphs is less than all characters in a font;

(b) sending a second client request directly to the font services unit via the API on the single computer that describes a second set of multiple glyphs and includes a destination field indicating a location of a second destination memory, wherein the second set of glyphs is less than all characters in a font;

(c) passing the first client request from the font services unit to the first scaler server via the operating system in a first asynchronous transaction message;

(d) passing the second client request from the font services unit to the second scaler server via the operating system in a second asynchronous transaction message;

(e) generating the first set of multiple glyphs by the first scaler server in response to the first asynchronous transaction message;

(f) generating the second set of multiple glyphs by the second scaler server in response to the second asynchronous transaction message;

(g) storing the first set of multiple glyphs directly into the first destination memory at the same time; and (h) storing the second set of multiple glyphs directly into the second destination memory at the same time.

8. A method as in claim 7 wherein step (a) further includes the step of:

(a1) sending a request from the first client to the font services unit asking for an estimate of the size of the glyphs.

9. A method as in claim 8 wherein step (a) further includes the step of:

(a2) allocating sufficient first destination memory to store the first set of glyphs.

10. A method as in claim 9 wherein step (a) further includes the step of:

(a3) sending the request from the first client to the font services unit using a function call.

11. A method as in claim 10 wherein step (b) further includes the step of:

(b1) reformatting the request into the transaction message.

12. A method as in claim 11 wherein step (c) further includes the step of:

(c2) passing a glyph code array and a destination field that indicates a location of the first destination memory in the first asynchronous transaction message.

13. A system for providing requested glyphs on a single computer having an operating system, comprising:

a first software client on the single computer, the first software client including means for sending a first multi-glyph request via an application programming interface (API) that includes a description of a first set of glyphs to be generated and a destination field indicating a location of a first destination memory in which to store the first set of glyphs once generated directly;

a second software client on the single computer, the software second client including means for sending a second multi-glyph request via the API that includes a description of a second set of glyphs to be generated and a destination field indicating a location of a second destination memory in which to store the second set of glyphs once generated, wherein the second set of glyphs is less than all characters in a font;

a font services unit in direct communication with the first and second software clients for receiving the first and second requests, the font services unit including means for forming a first message from the first request and a second message from the second request, and means for asynchronously transmitting the first and second messages via the operating system;

a first scaler server process in communication with the font services unit for generating the first set of multiple glyph data in response to receiving the first message, the first scaler server process including means for storing the first set of multiple glyph data in the first destination memory at the same time; and a second scaler server process in communication with the font services unit for generating the second set of multiple glyph data in response to receiving the second message, the second scaler server process including means for storing the second set of multiple glyph data in the second destination memory at the same time.

14. A system as in claim 13 wherein the first message includes a glyph code array, a glyph description, and a strike description.

15. A system as in claim 13 wherein the first scaler server includes means for estimating a size of the multiple glyphs for the first client.

16. A system as in claim 15 wherein the first client allocates sufficient first destination memory in response to the size estimate from the first scaler server process.

17. A computer-readable medium containing program instructions for providing requested glyph data items to multiple software clients from a font scaler sub-system on a single computer having an operating system, the program instructions comprising:

(a) instructions for directly accepting a first request from a first software client via an application programming interface (API) on the single computer, the request including a first description of a first set of multiple glyphs and a destination field indicating a location of a first destination memory, wherein the first set of glyphs is less than all characters in a font;

(b) instructions for directly accepting a second request from a second software client via the API on the single computer, the request including a second description of a second set of multiple glyphs and a destination field indicating a location of a second destination memory, wherein the second set of glyphs is less than all characters in a font;

(c) instructions for forming a first message from the first request;

(d) instructions for forming a second message from the second request;

(e) instructions for asynchronously sending the first message to a scaler server process via the operating system;

(f) instructions for asynchronously sending the second message to the scaler server process via the operating system;

(g) instructions for generating first multiple glyph data items from the first description of the multiple glyphs;

(h) instructions for storing the first set of multiple glyph data items directly into the first destination memory at the same time;

(i) instructions for generating second set of multiple glyph data items from the second description of the multiple glyphs; and (j) instructions for storing the second multiple glyph data items directly into the second destination memory at the same time.

18. A computer-readable medium as in claim 17 wherein instruction (c) further includes the instruction of:

(c1) instructions for placing a glyph code array, a glyph data description, and a strike description in the first message.

19. A computer-readable medium as in claim 18 wherein instruction (c) further includes the instruction of:

(c2) instructions for placing a destination structure in the first message indicating a location of the first destination memory.

20. A computer-readable medium as in claim 19 wherein instruction (a) further includes the instruction of:

(a1) instructions for allocating sufficient first destination memory to store the glyph data items described in the first request.

21. A computer-readable medium as in claim 20 wherein instructions (a) and (b) further include the instructions of:

instructions for passing the multi-glyph request to an open font architecture services unit.

22. A computer-readable medium as in claim 21 wherein instruction (a1) further includes the instruction of:

(a1i) instructions for estimating the size of the glyph data items before allocating the first destination memory.

23. A computer-readable medium as in claim 22 wherein instruction (a1) further includes the instruction of:

(a1ii) instructions for requesting the first scaler server process to perform the estimate.

* * * * *